United States Patent
Cowley et al.

(10) Patent No.: US 7,031,588 B2
(45) Date of Patent: Apr. 18, 2006

(54) ARTICULATED HIGH DENSITY FIBER OPTIC SPLICE AND TERMINATION SHELF

(75) Inventors: Simon C. Cowley, McKinney, TX (US); Wade J. Womack, Allen, TX (US)

(73) Assignee: Commscope Solutions Properties, LLC, Sparks, NV (US)

( * ) Notice: Subject to any disclaimer, the term of this patent is extended or adjusted under 35 U.S.C. 154(b) by 206 days.

(21) Appl. No.: 10/832,893

(22) Filed: Apr. 27, 2004

(65) Prior Publication Data
US 2005/0237721 A1    Oct. 27, 2005

(51) Int. Cl.
*G02B 6/00* (2006.01)
(52) U.S. Cl. .................. 385/135; 361/727; 312/323
(58) Field of Classification Search ............... 385/135, 385/137; 361/724–727, 223.1, 223.2; 312/273, 312/274, 127, 130
See application file for complete search history.

(56) References Cited

U.S. PATENT DOCUMENTS

| | | | |
|---|---|---|---|
| 4,662,690 A * | 5/1987 | Genereaux ................. 312/323 |
| RE32,816 E * | 1/1989 | Plank ......................... 312/330 |
| 4,836,624 A * | 6/1989 | Schwickrath ............... 312/216 |
| 5,129,030 A * | 7/1992 | Petrunia ..................... 385/135 |
| 5,442,725 A * | 8/1995 | Peng .......................... 385/135 |
| 5,460,441 A * | 10/1995 | Hastings et al. ............ 312/298 |
| 5,751,882 A | 5/1998 | Daems et al. |
| 5,774,337 A * | 6/1998 | Lee et al. .................... 361/725 |
| 5,825,616 A * | 10/1998 | Howell et al. ............... 361/684 |
| 5,825,962 A * | 10/1998 | Walters et al. .............. 385/135 |
| 5,956,449 A | 9/1999 | Otani et al. |
| 6,954,354 B1 * | 10/2005 | Shyr .......................... 361/683 |
| 6,969,130 B1 * | 11/2005 | Newton et al. ........... 312/223.1 |
| 2005/0078929 A1 * | 4/2005 | Iwanek ....................... 385/135 |

FOREIGN PATENT DOCUMENTS

WO    WO 2004/021061    3/2004

OTHER PUBLICATIONS

Systimax Structured Connectivity Solutions Product Guide (2003) pp. 221, 223.
European Search Report for application No. EP 05 00 8561 completed on Jul. 18, 2005.

* cited by examiner

*Primary Examiner*—Lisa Lea-Edmonds
*Assistant Examiner*—Ingrid Wright
(74) *Attorney, Agent, or Firm*—Myers Bigel Sibley & Sajovec

(57) ABSTRACT

A shelf includes: a main panel unit; a slide member; and a component mounting panel. The slide member is pivotally attached to the main panel unit for pivotal movement about a first pivot axis and is configured for slidable mounting relative to an enclosure such that the main panel unit can be moved from a retracted position within the enclosure to an extended position that is forward of the enclosure. The main panel unit is pivotable relative to the slide member between a raised position and a lowered position when extended forwardly of the enclosure. The component mounting panel is pivotally mounted to the main panel unit for pivotal movement about a second pivot axis between front access and rear access positions.

36 Claims, 12 Drawing Sheets

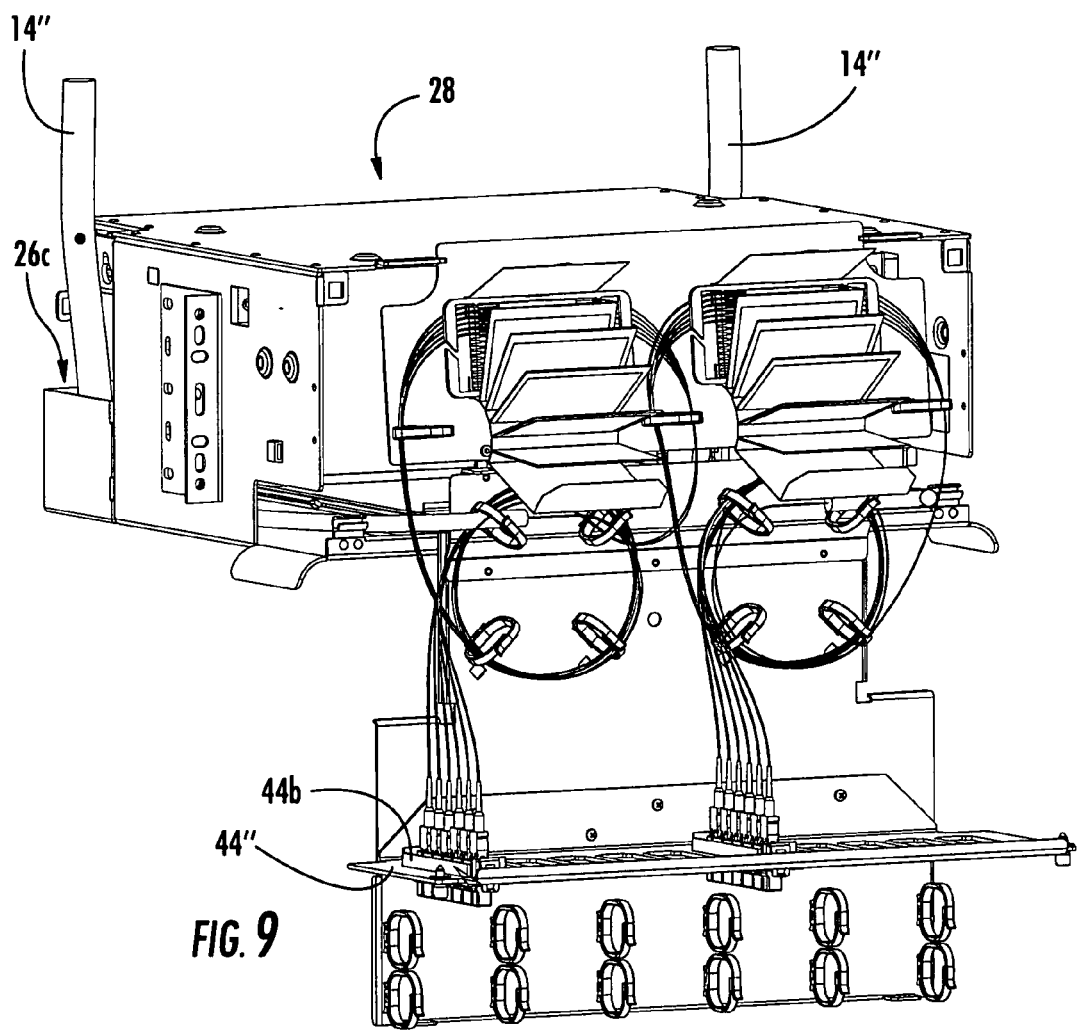

us7031588b2

ARTICULATED HIGH DENSITY FIBER OPTIC SPLICE AND TERMINATION SHELF

FIELD OF THE INVENTION

This invention is directed generally to shelves, and more particularly to multi-functional shelves.

BACKGROUND OF THE INVENTION

Data centers that support one or more businesses, factories or residential areas typically comprise one or more racks or cabinets filled with interconnection sites for optical fibers and fiber optic cables. In a typical installation, fiber optic cables that include multiple optical fibers from an external source (these are often known as "outside plant" or "OSP" fibers) enter the cabinet and are spliced together with individual optical fibers known as "pigtails." Splicing typically occurs in a splice tray or similar component that includes multiple splice sites. The pigtail fibers are then connected within the cabinet to standard termination sites. The termination sites include termination ports that connect optically with "jumper" optical fibers that exit the rack or cabinet to supply data or other information in optical form to the remainder of the building or site. The termination sites can be provided in a number of forms, including fiber distribution cartridges, fiber distribution modules, multi-position adapter couplers and/or bezels.

Splicing sites and termination sites are mounted on enclosed shelves that are then mounted within the rack. In many racks, splicing sites and termination sites are mounted on different shelves. The shelves will sometimes slide from inside the enclosure to provide easier access to an operator working on the termination and splicing sites. Exemplary sliding termination shelves include SYSTIMAX® models LST1U-072/7 and LST1U-144/9, available from SYSTIMAX Solutions, Richardson, Tex. Exemplary splice shelves include Model Nos. LSS1U-0725/5, available from SYSTIMAX Solutions.

Of course, housing the splicing and termination sites on different shelves can complicate or disorganize the distribution of OSP cables, pigtails and exiting jumper fibers while simultaneously reducing available rack space. However, including splicing sites and termination sites on the same shelf can result in that space being overly dense with a "rat's nest" of fibers and cables. Consequently, working on splices and terminations within that small volume can be quite cumbersome and difficult. An exemplary shelf that demonstrates the difficulty of including both termination and splicing sites is the SYSTIMAX® model LSC2U-024/5, also available from SYSTIMAX Solutions, which has the capacity for only a single splice tray.

In view of the foregoing, there remains a need for an improved approach to termination and splice site shelving.

SUMMARY OF THE INVENTION

The present invention is directed to a shelf that can be stored within a rack or cabinet for providing access to items residing inside the shelf. The shelf includes: a main panel unit; a slide member; and a component mounting panel. The slide member is pivotally attached to the main panel unit for pivotal movement about a first pivot axis and is configured for slidable mounting relative to an enclosure such that the main panel unit can be moved from a retracted position within the enclosure to an extended position that is forward of the enclosure. The main panel unit is pivotable relative to the slide member between a raised position and a lowered position when extended forwardly of the enclosure. The component mounting panel is pivotally mounted to the main panel unit for pivotal movement about a second pivot axis between front access and rear access positions such that a front surface of the component mounting panel can be accessed from a forward work location when the component mounting panel is in the front access position, and a rear surface of the component mounting plate can be accessed from a forward work location when the component mounting plate is in its rear access position. This configuration can enable the mounting of components (such as splice site carriers and termination site devices) on the same shelf in great density while still enabling an operator to work easily on components mounted on the shelf from a location forward of the shelf.

In some embodiments, the main panel unit includes a termination site mounting frame that includes sites for mounting fiber optic termination devices. Also, the component mounting panel may be a splice site mounting panel upon which splice site carriers (such as splice trays and the like) can be mounted. Further, in certain embodiments, the shelf can permit access to both sides of the component mounting panel from the rear of the rack when the main panel unit is in its stored position within the enclosure.

Another aspect of the present invention is a communications termination and splicing system, comprising: an equipment rack; an enclosed shelf mounted to the equipment rack of the configuration described above residing in an enclosure; at least one plurality of fiber optic termination site device mounted in the main panel mounting sites; a splice site carrier mounted to the splice site mounting panel; a plurality of OSP cables optically connected to the splice sites on the splice site carrier; a plurality of pigtail fibers extending between and connected to respective splice sites and termination sites; and a plurality of optical jumper fibers connected to the termination sites.

BRIEF DESCRIPTION OF THE FIGURES

FIG. 9 is a perspective view of further alternative embodiments of a shelf of the present invention.

DETAILED DESCRIPTION OF EMBODIMENTS OF THE INVENTION

The present invention will now be described more fully hereinafter with reference to the accompanying drawings, in which preferred embodiments of the invention are shown. This invention may, however, be embodied in many different forms and should not be construed as limited to the illustrated embodiments or other embodiments set forth herein; rather, these embodiments are provided so that this disclosure will be thorough and complete, and will fully convey the scope of the invention to those skilled in the art. In the figures, the dimensions of some components may be exaggerated for clarity.

Figure 1:
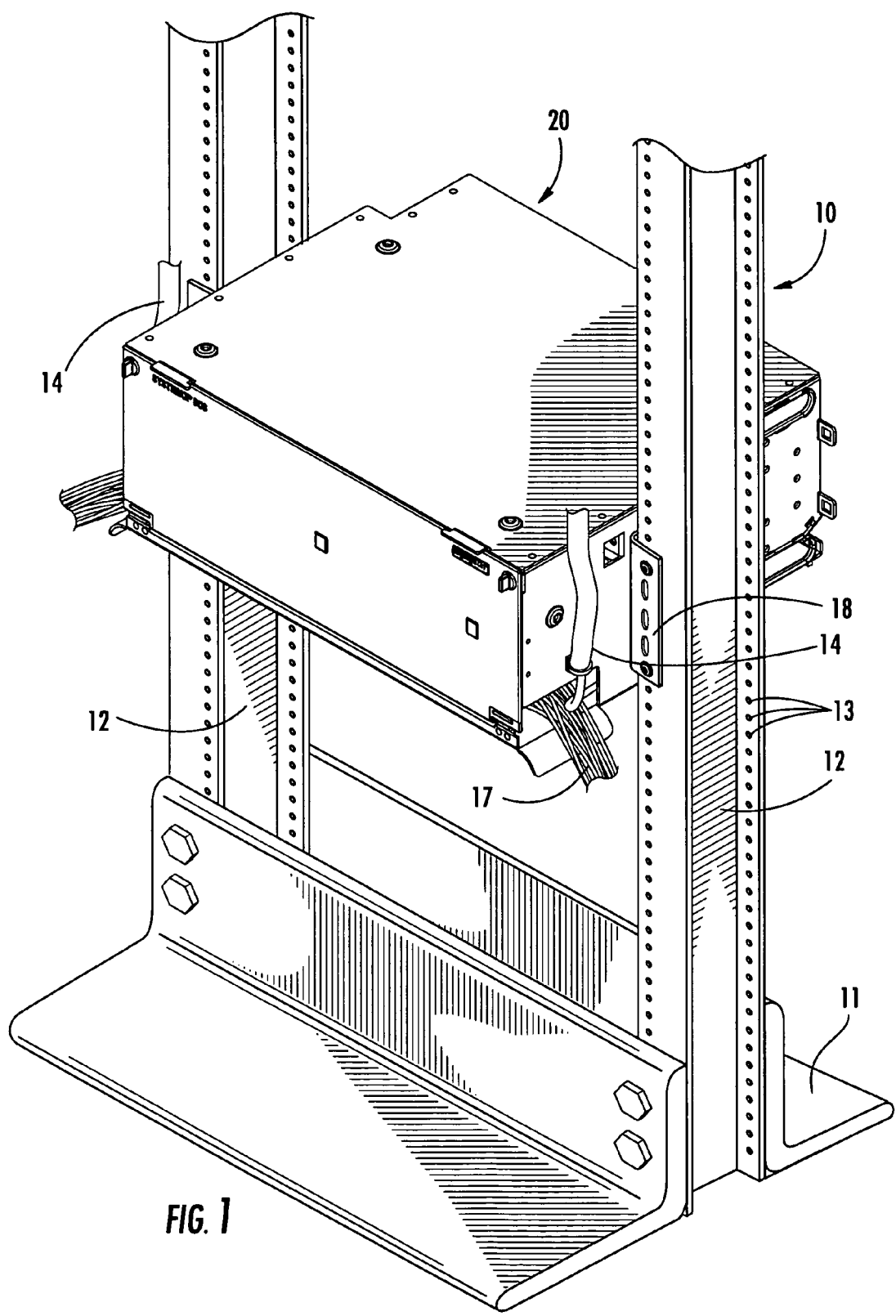
FIG. 1 is a perspective view of a data center equipment rack with an enclosed shelf of the present invention mounted thereon.

Turning now to the figures, a typical data center equipment rack, designated broadly at 10, is illustrated in FIG. 1. The rack 10 includes a base 11 that rests on an underlying surface and two uprights 12 that extend vertically from either end of the base 11. The uprights 12 have apertures 13 that enable structures, such as an enclosed shelf 20, to be mounted thereon via mounting brackets 18 or other mounting components. An exemplary rack is Model No. 02009, available from Hendry Telephone Products, Santa Barbara, Calif. Other structures that may be mounted on the rack 10 include blank panels and the like. Those skilled in this art will recognize that other base structures may also be employed to mount shelves of the present invention.

Figure 2:
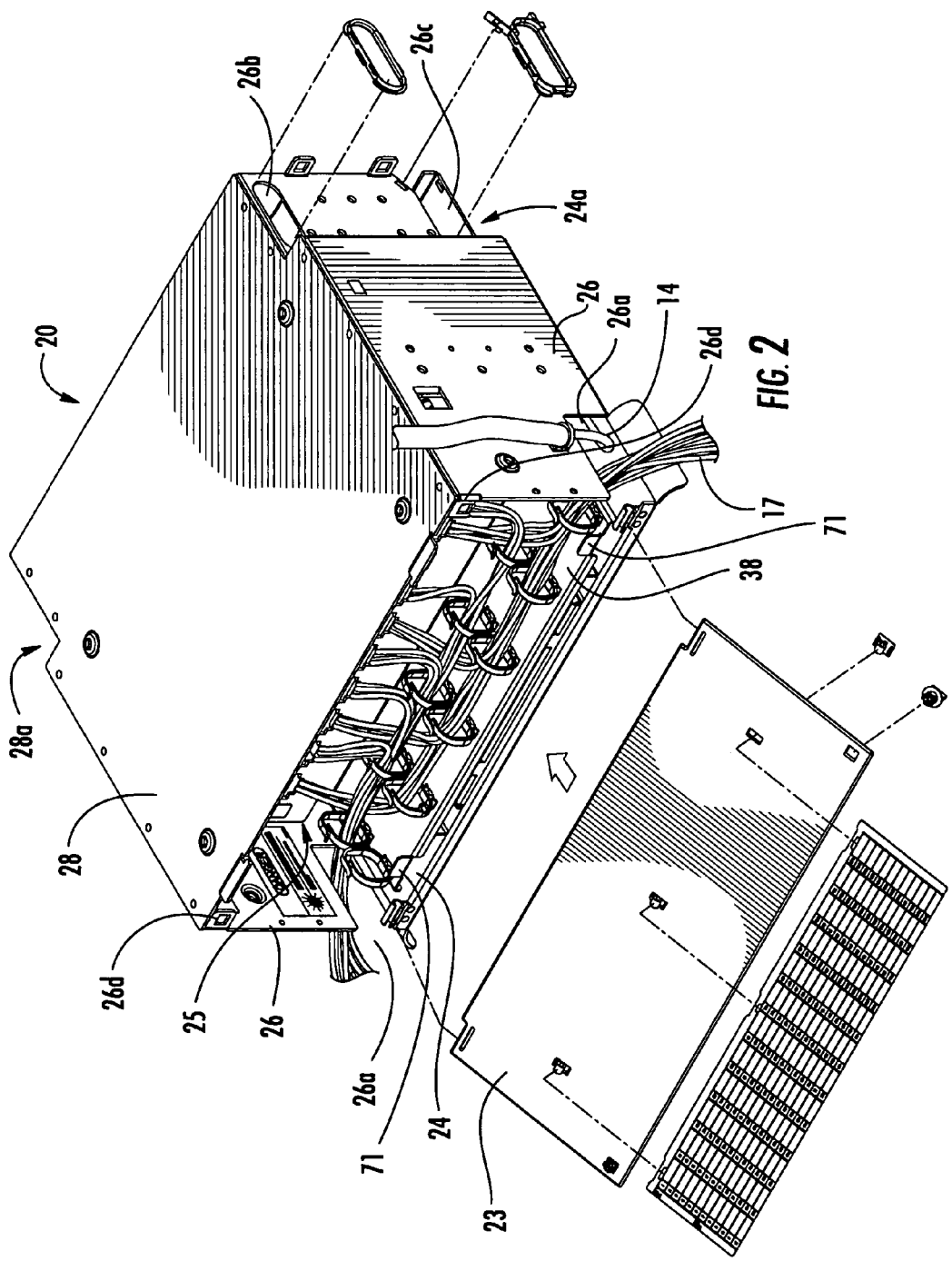
FIG. 2 is a partially exploded perspective view of the shelf of FIG. 1 with the cover removed.

Turning now to FIG. 2, the enclosed shelf 20 includes an enclosure 22 having a floor 24, side walls 26, a ceiling 28, and a removable front cover 23. The panels that comprise these components are assembled to form a box-shaped structure with an open rearward end. Both the floor 24 and ceiling 28 are generally rectangular with the exceptions of cutout areas 24*a*, 28*a* in their rearward portions. The side walls 26 are stepped panels that follow the lateral edges of the floor 24 and ceiling 28. In its lower front corner, each side wall 26 includes a cutout portion 26*a* that provides entry and exit locations to cables and fibers. Also, in its upper and lower rear portions, each side wall 26 has oblong cable entry apertures 26*b*, 26*c* that enable cable to enter the cavity 25 of the enclosure 22. The cover 23 attaches to the side walls 26 via fasteners inserted through mounting tabs 26*d*.

Figure 2A:
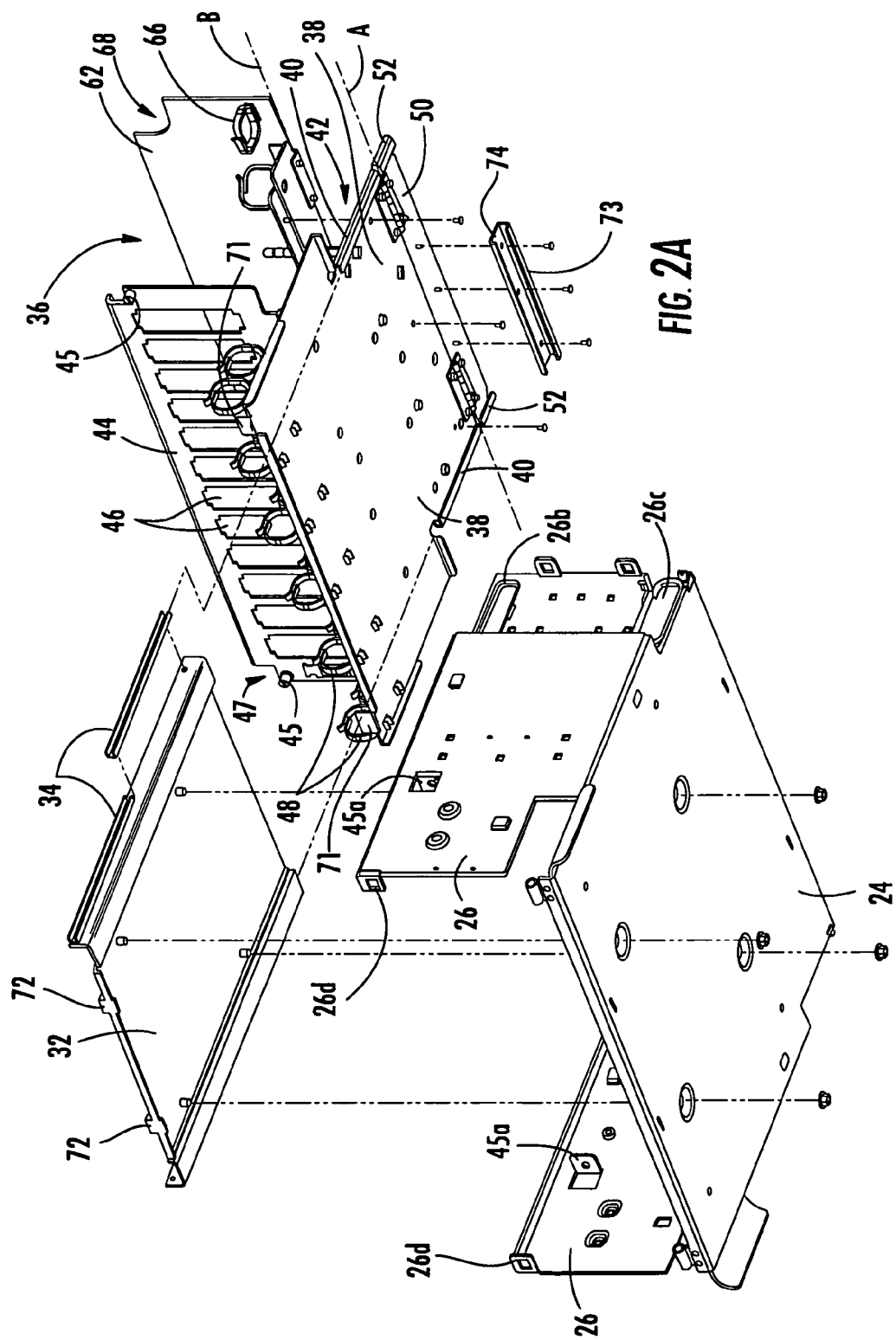
FIG. 2A is a bottom, exploded, perspective view of the components of the enclosed shelf of FIG. 2, including the floor and side walls of the enclosure, the main panel unit, slide member, the base plate, the termination site mounting frame, and the splice site panel.

Turning now to FIG. 2A, the floor 24 also includes a fixed base plate 32 that is mounted above the main floor panel 24*a*. The base plate 32 includes horizontally-disposed guides 34 on its lateral edges that engage a main panel plate unit 36 (described below) for sliding motion relative thereto. The base plate 32 also includes stops 72 on its front edge.

Those skilled in this art will appreciate that the enclosure 22 may take other forms and shapes and forms and still be employed for use with the present invention. For example, the enclosure may include a rear wall. As another example, the side walls may be planar rather than stepped, and/or they may include more or fewer cable and fiber entry and exit apertures. Other configurations will be apparent to the skilled artisan and need not be described in detail herein.

Referring again to FIG. 2A, the main panel unit 36 includes a main panel 38 and a slide member 50. The main panel 38 is generally planar and rectangular, with cutout areas 42 in its rear corners to conform to the shape of the floor 24. Channels 40 are attached to the inner edges of the cutout areas 42. The channels 40 engage the guides 34 of the base plate 32 to enable the main panel 38 to slide horizontally relative to the base plate 32 and, in turn, to the floor 24. The front edge of the main panel 38 includes two finger tabs 71 (seen best in FIG. 2). A ramped panel 56 (best seen in FIG. 7A) is fixed at its front edge to a rear portion of the main panel 38; an upper plane 57 of the ramped panel 56 is positioned above the rear edge of the main panel 38.

Those skilled in this art will appreciate that the main panel unit may take different forms than those discussed above. For example, the main panel 38 and ramped panel 56 may be formed as a unitary member. Alternatively, the ramped panel 56 may be omitted entirely. The main panel 38 may also formed in different shapes and sizes. Other alternative configurations may also be possible.

Returning to FIG. 2A, a cartridge mounting frame 44 is vertically disposed and mounted to a front portion of the main panel 38. The cartridge mounting frame 44 includes a plurality of oblong, vertically oriented apertures 46 that are configured to receive fiber distribution cartridges (see FIG. 3). The upper corners of the cartridge mounting frame 44 have cutout areas 47 that are sized and configured to clear the mounting tabs 26*d* when the main panel unit 36 is moved to its forward position. Just below the cutout areas 47, retaining fasteners 45 extend through the cartridge mounting frame 44 and are received in tabs 45*a* that extend inwardly from the side walls 26.

Those skilled in this art will appreciate that the cartridge mounting frame 44 may take other forms (e.g., it may have more or fewer cartridge slots than are shown). Alternatively, another mounting structure, such as a frame for a jumper cable module or a jumper cable bezel, that provides a plurality of optical fiber termination sites may also be employed with this invention.

Figure 3:
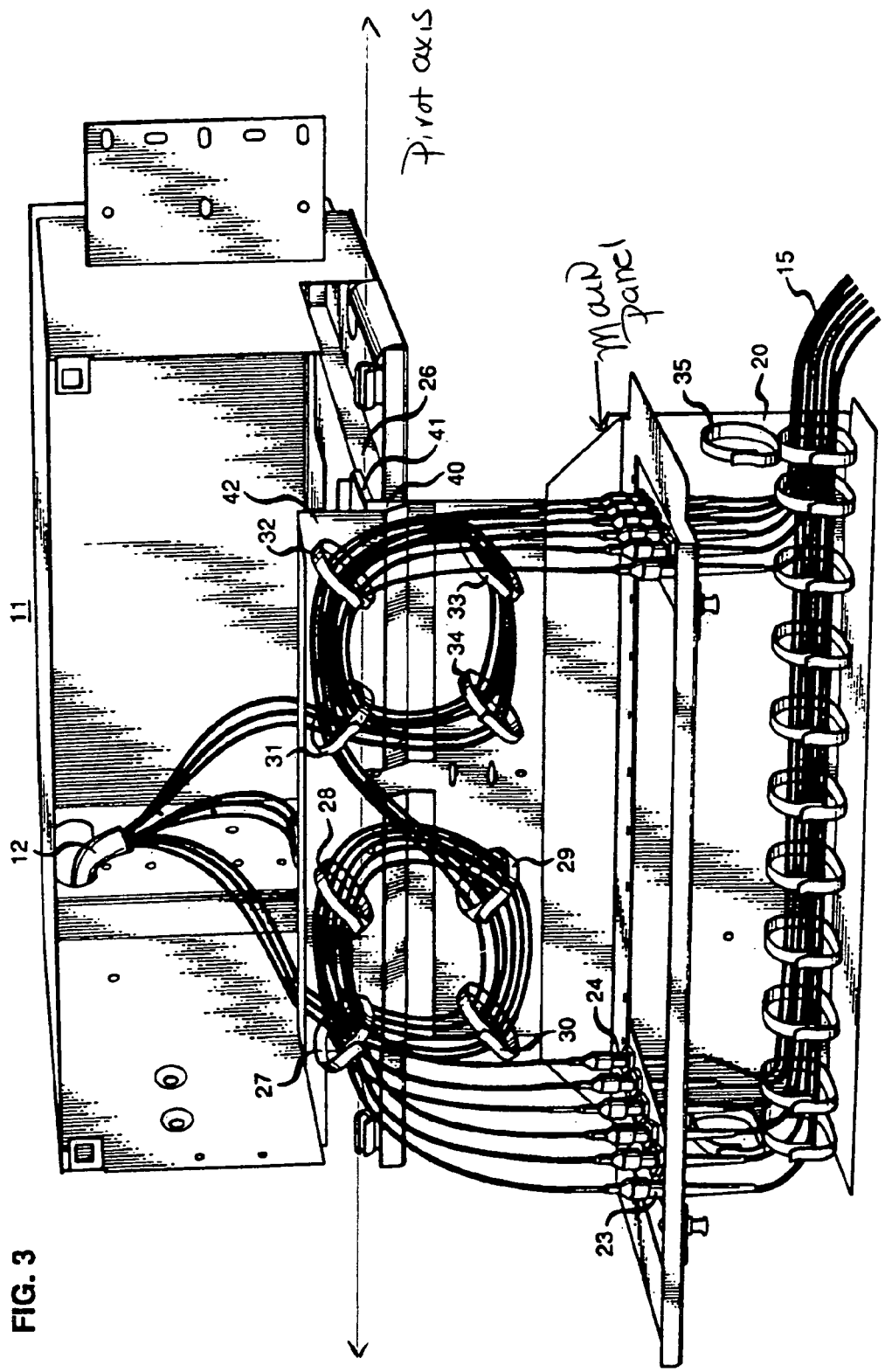
FIG. 3 is a top perspective view of the shelf of FIG. 2 with the main panel unit in an extended, raised position forwardly of the enclosure.
Figure 6A:
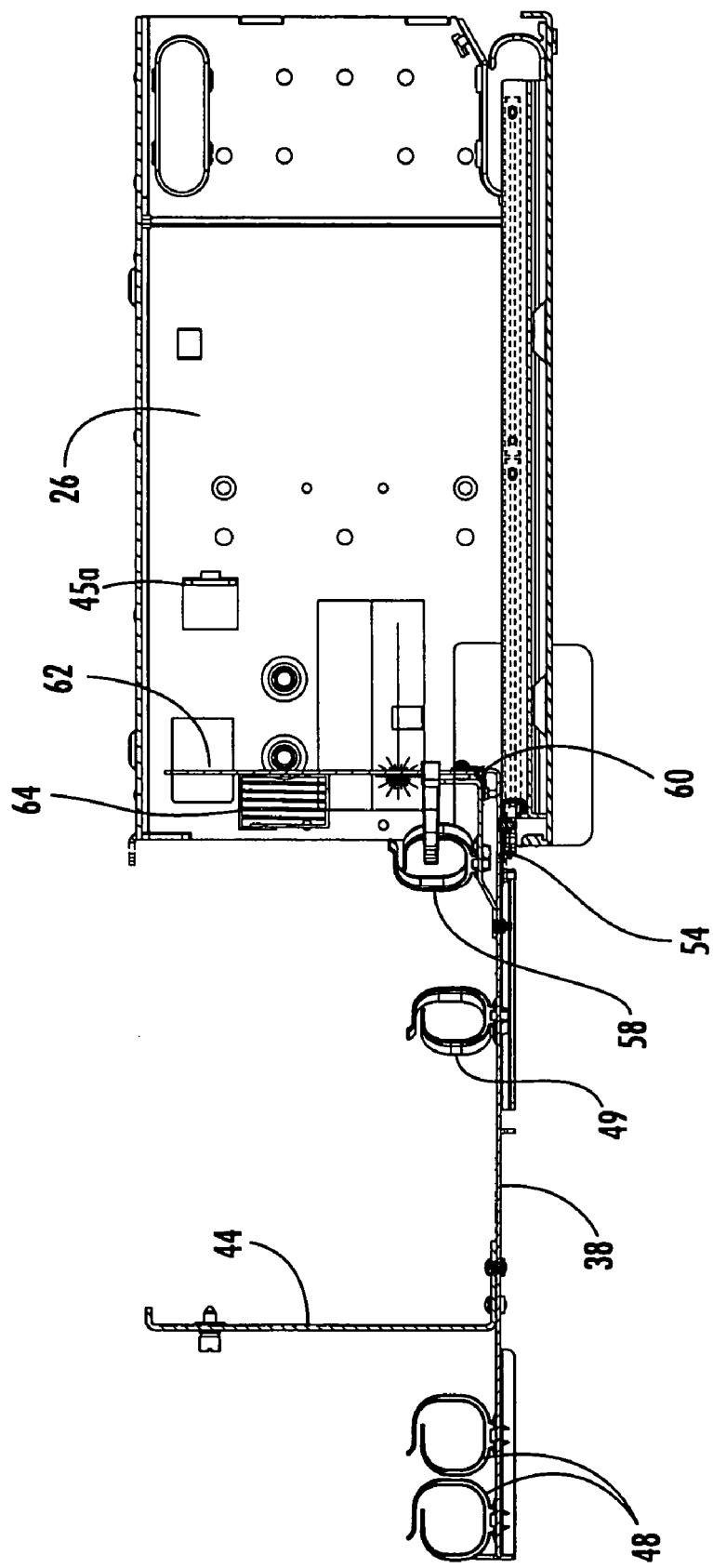
FIG. 6A is a side section view of the shelf of FIG. 2 with the main panel unit in an extended, raised position forwardly of the enclosure.

Referring now to FIGS. 3 and 6A, fiber organizing rings 48 are mounting on the main panel 38 in front of the cartridge mounting frame 44. In addition, more fiber organizing rings 49 are mounted on the main panel 38 behind the cartridge mounting frame 44. Other types and arrangements of fiber organizing components may also be employed. Four fiber organizing rings 58 are positioned on the upper plane 57 of the ramped panel 56. In some embodiments, other fiber organizing components may be employed in addition to or instead of fiber organizing rings, or fiber organizing structures may be omitted entirely.

Figure 7A:
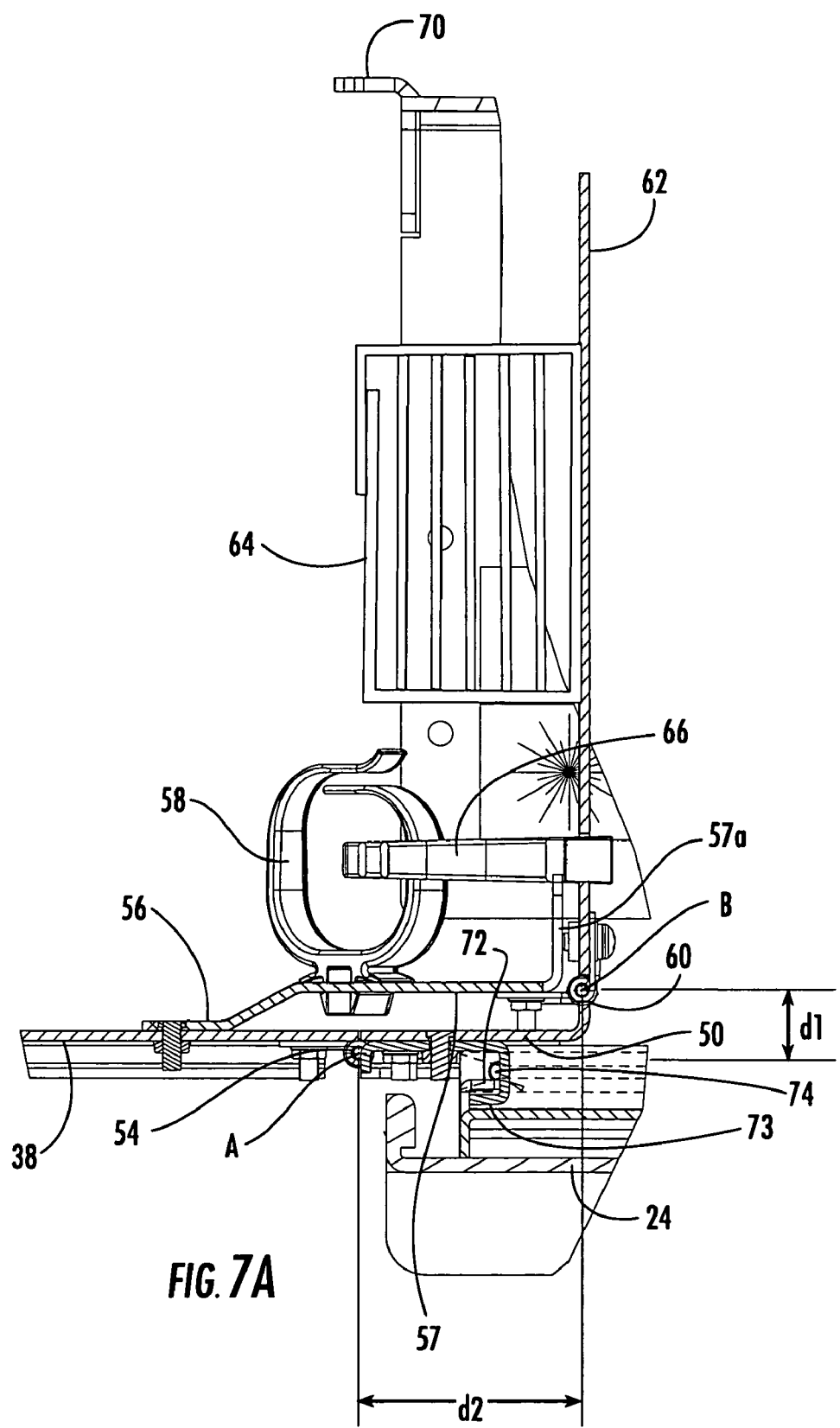
FIG. 7A is an enlarged side section view of the shelf as illustrated in FIG. 6A showing the splice site panel.

Referring now to FIGS. 2A and 7A, the slide member 50 is pivotally attached to the rear edge of the main panel 38 at a hinge 54, which is located below the upper plane 57 of the ramped panel 56. The hinge 54 allows the main panel 38 to rotate relative to the slide member 50 about a pivot axis A. The hinge 54 is spring-loaded and biases the main panel 38 downwardly (i.e., in the counterclockwise direction from the vantage point of FIG. 7A). The slide member 50 includes channels 52 at its lateral edges that engage and are slidable relative to the guides 34 of the base plate 32. The channels 52 are substantially aligned with the channels 40 of the main panel 38, with the result that both sets of channels 40, 52 can engage and slide relative to the guides 34 of the base plate 32. A bracket 74 is mounted below the slide member 50 and includes a stop flange 73 that projects downwardly.

Those skilled in this art will appreciate that the slide member 50 and the channels 52 may take different forms in other embodiments. For example, two separate slide members may be used, or the channels 52 may not be aligned with the channels 40 such that two different sets of guides are used. Other configurations that permit relative sliding motion between the base plate 32 and the main panel 38 and slide member 50 may also be employed.

Figure 4:
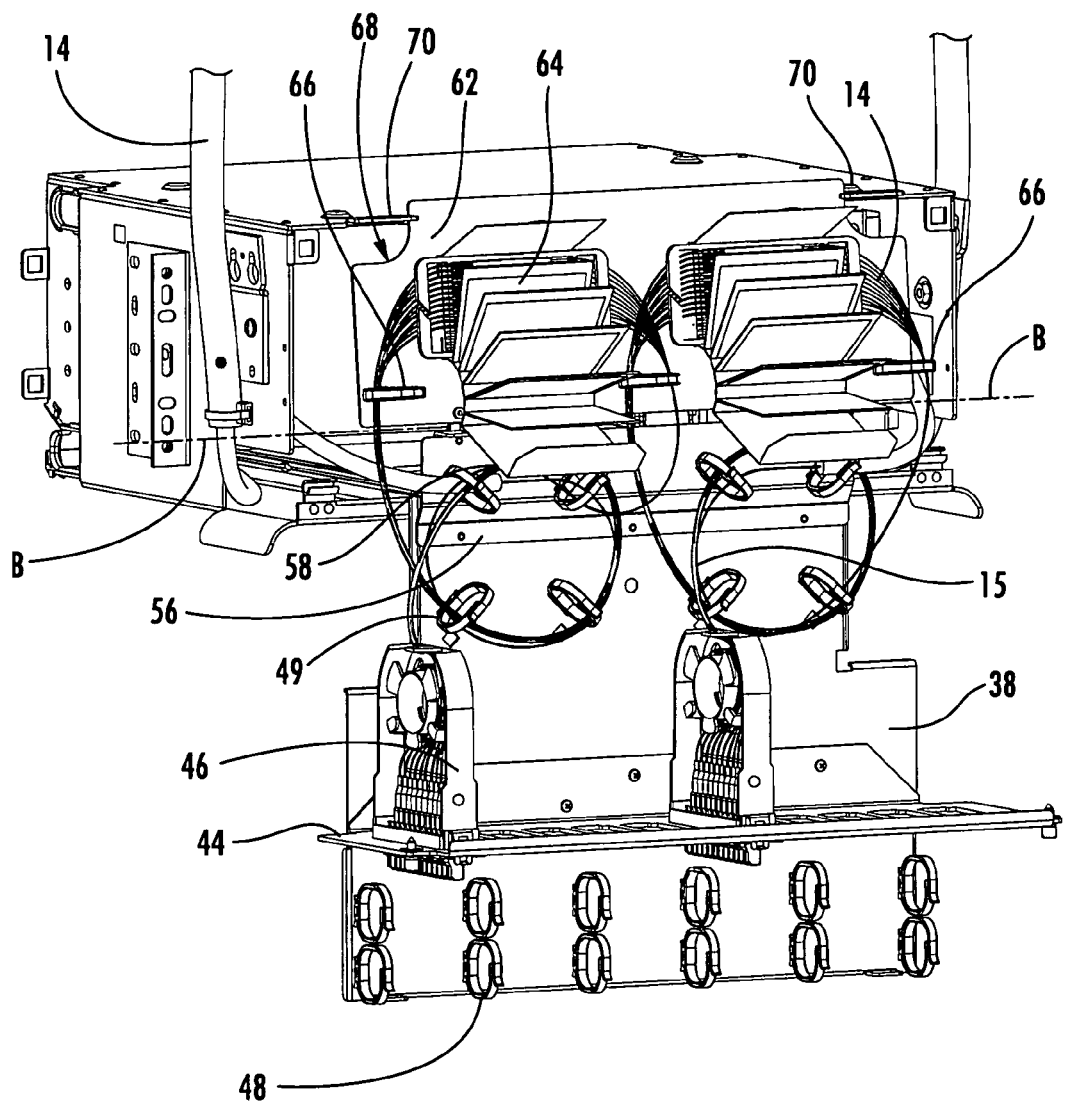
FIG. 4 is a top perspective view of the shelf of FIG. 2 with the main panel unit in its lowered position and the splice site panel in its forward access position.
Figure 5:
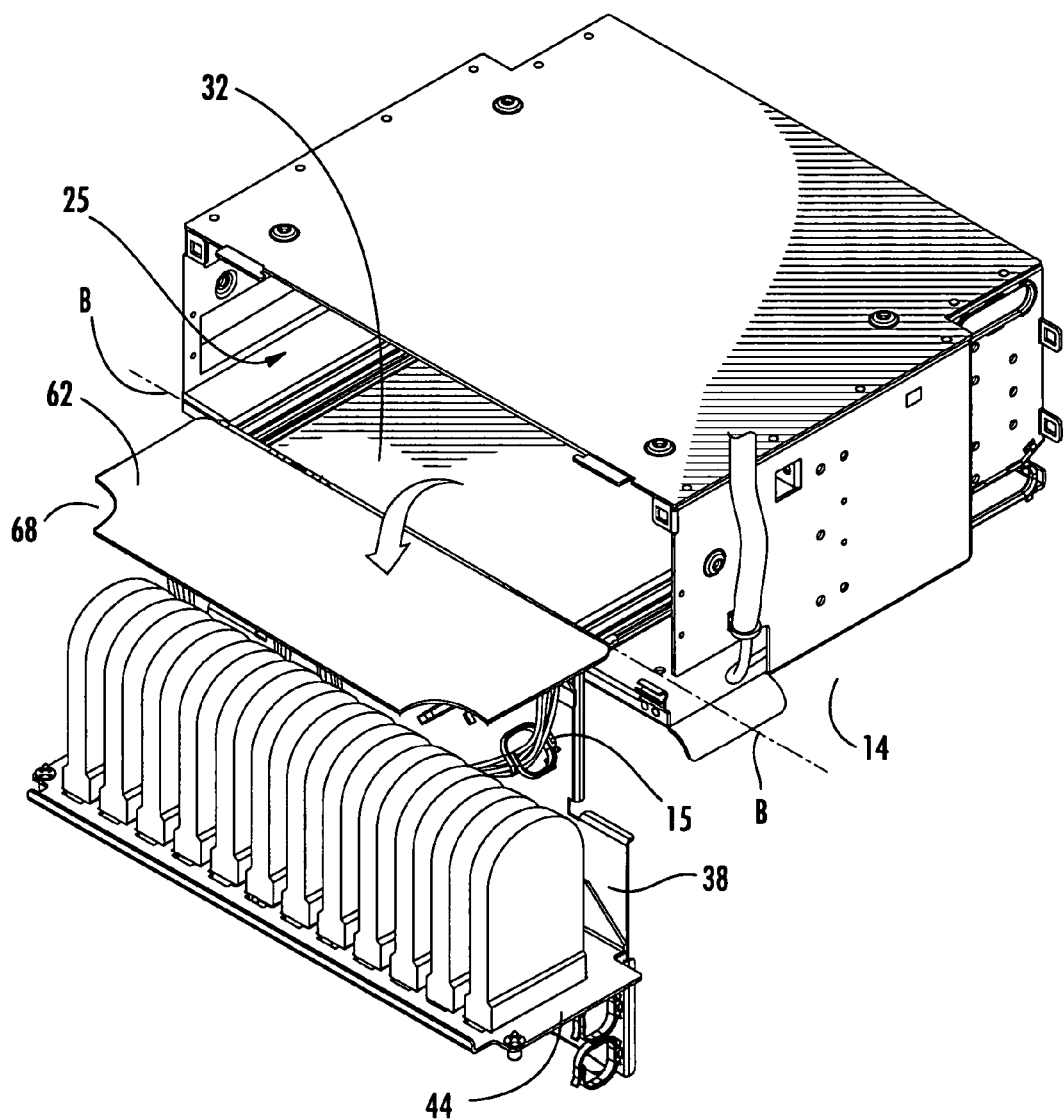
FIG. 5 is a top perspective view of the shelf of FIG. 2 with the main panel unit in its lowered position and the splice site panel in its rear access position.

Referring now to FIGS. 2A, 4 and 7A, a generally planar splice site panel 62 is pivotally attached to the rear end of the upper plane 57 of the ramped panel 56 via a hinge 60. The hinge 60 enables the splice site panel 62 to rotate about a pivot axis B that is generally parallel but noncoincident with the pivot axis A. The hinge 60 is spring-loaded and biases the splice site panel 62 toward the main panel 38 (i.e., counterclockwise from the vantage point of FIG. 7A); the splice site panel 62 is prevented from rotating toward the main panel 38 substantially beyond a position normal thereto by a vertical tab 57a (and a fastener attached thereto) that extends upwardly from the upper plane 57 of the ramped panel 56. In the position illustrated in FIG. 7A, the pivot axis B is located a distance d1 above the pivot axis A and a distance d2 rearwardly of the pivot axis A; in some embodiments, d2 is greater than d1.

The splice site panel 62 includes mounting locations for one or more splice site carriers 64. These splice site carriers 64 can take many forms, such as conventional splice trays, that provide sites for the splicing of optical fibers. An exemplary splice tray is Model No. 105356562, available from SYSTIMAX Solutions. Splice plates can be mounted singly or, as shown herein, combined in splice plate units such as the splice carriers and splice "wallets" of the type discussed in co-assigned and co-pending U.S. patent application Ser. No. 10/840,681, filed May 6, 2004 and entitled *Carrier for Multiple Slice Trays,* the disclosure of which is hereby incorporated herein in its entirety. The splice trays may provide splice sites for mechanical, fusion, mass fusion, or other splicing techniques.

The splice site panel 62 also includes three fiber organizing rings 66 that are mounted between the splice site carriers 64 and the hinge 60. Further, the upper corners of the splice site panel 62 have cutout areas 68 to assist with operation of the shelf 20 (as described in greater detail below) and to clear fibers entering the shelf 20 in some fiber and cable routing schemes.

As best seen in FIG. 3, the enclosed shelf 20 is positioned within the rack 10 to receive fiber optic cables 14 (typically OSP cables) from an external sources. In the embodiment illustrated in FIGS. 1–7A, the fiber optic cables 14 enter the shelf 20 through the cutout areas 26a, and travel to the splice site panel 62, where they connect to splice sites on the splice carriers 64. Pigtail fibers 15 are spliced to individual splice sites in the splice site carriers 64 and travel to termination cartridges 16 mounted in the cartridge mounting frame 44 (exemplary termination cartridges, which typically provide 12 termination sites per cartridge, include Model No. 760027748, available from SYSTIMAX Solutions). As shown, the pigtail fibers 15 may pass through one or more of the fiber organizing rings 49, 58, 66. Jumper fibers 17 are connected optically to the termination cartridges 16 and travel therefrom to exit the enclosure 20 through the cutout areas 26a in the side walls 26; again, in passing to the cutout areas 26a, the jumper fibers 17 may pass through one or more of the fiber organizing rings 48.

Referring now to FIG. 2, in its retracted and operative position, the main panel unit 36 is retracted within the cavity 25 of the enclosure 22. In this position, the main panel 38 is substantially horizontally disposed and coplanar with the slide member 50, with its channels 40 engaged on the guides 34. The slide member 50 is positioned above the rear end portion of the fixed base plate 32, with the channels 52 engaged on the rear sections of the guides 34. The cartridge mounting frame 44 is generally vertically oriented and is affixed to the side walls 26 via the fasteners 45 being inserted into apertures in the tabs 45a. The splice site plate 62 is rotated about the pivot axis B such that it is generally vertically oriented; the splice site plate 62 is held in this position via the tab 57a and a fastener attached thereto. The shelf 20 will remain in this position during typical operation.

When cables and/or fibers associated with the shelf 20 are to be worked on, an operator can move the main panel unit 36 to an extended position in front of the enclosure 22 (see FIGS. 3, 6A and 7A). This movement is accomplished by first disengaging the fasteners 45 that fasten the cartridge mounting frame 44 to the side walls 26. The operator can then grasp the main panel 38 by slipping one finger onto each of the finger tabs 71 and pulling forwardly. This force causes the main panel unit 36 to slide relative to the base plate 32, as the channels 40, 52 of the main panel 38 and slide member 50 slide along the guides 34 of the base plate 32. This movement ceases when the stops 72 on the base plate 32 contact the flange 73 on the bracket 74. Also, the splice slide panel 62 is maintained in a substantially vertical orientation by its interaction with the tab 57a.

Figure 6B:
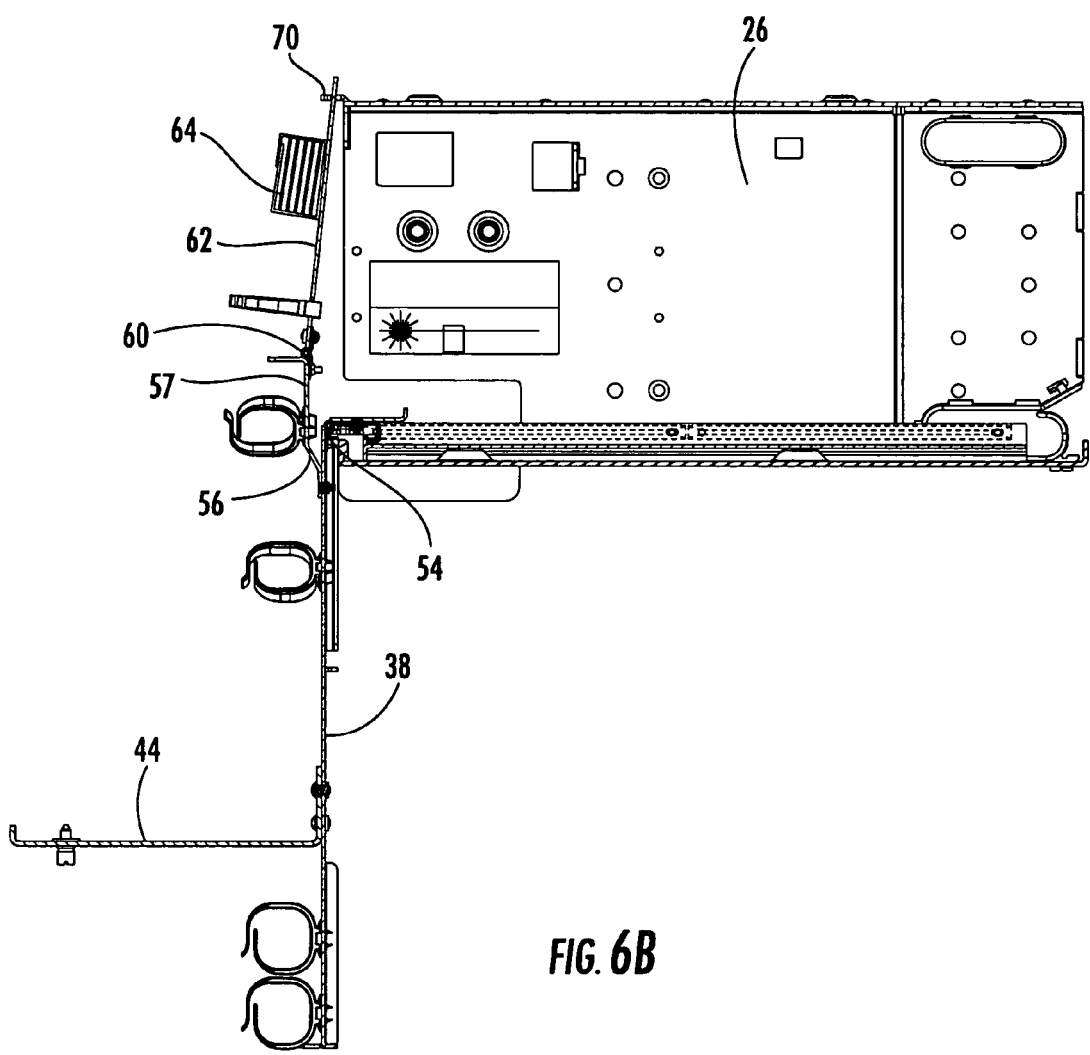
FIG. 6B is a side section view of the shelf of FIG. 2 with the main panel unit in its lowered position and the splice site panel in its forward access position.
Figure 7B:
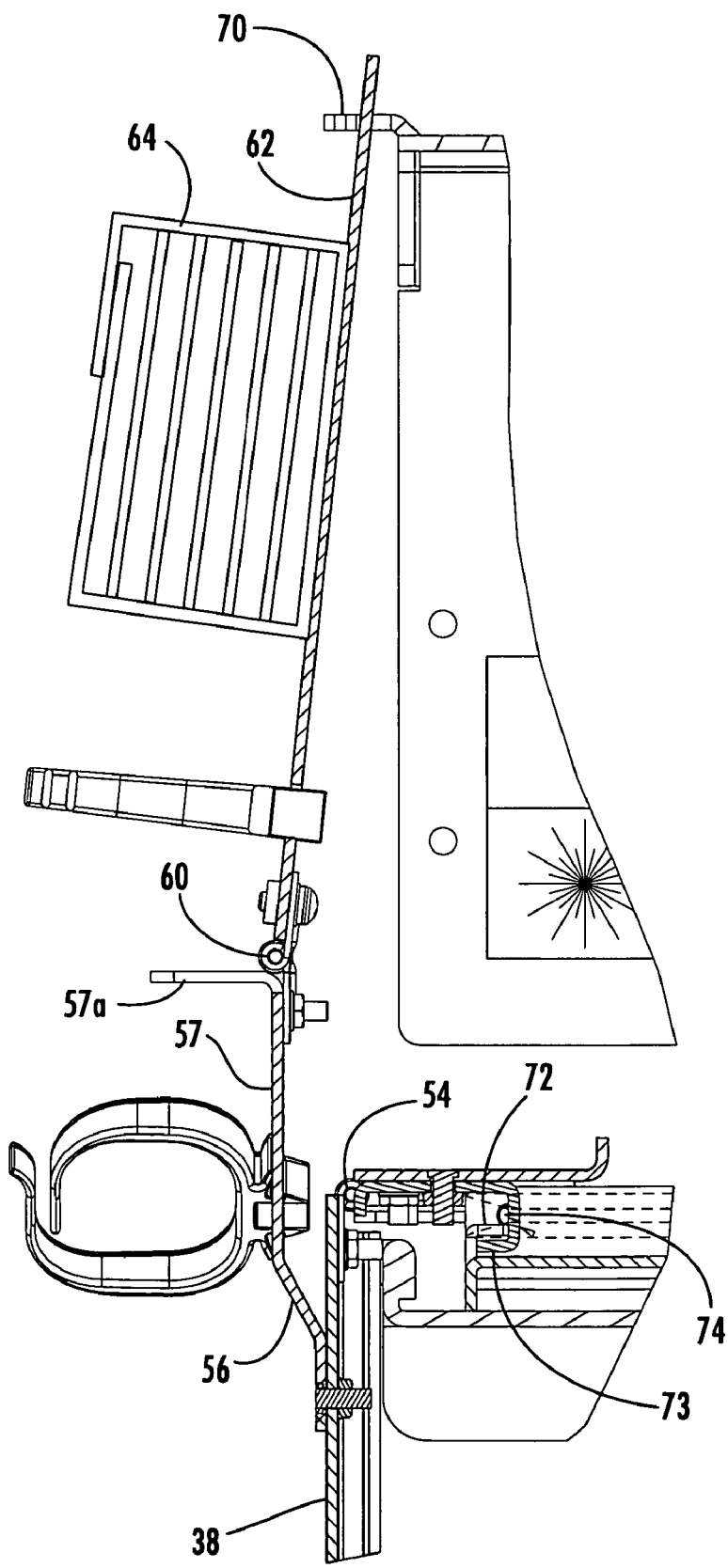
FIG. 7B is an enlarged side section view of the shelf as illustrated in FIG. 6B showing the splice site panel.

Referring now to FIGS. 4, 6B and 7B, the main panel unit 36 can then be moved to a lowered position by allowing the forward end of the main panel 38 to rotate downwardly (i.e., in a counterclockwise direction from the vantage point of FIGS. 6B and 7B) about the pivot axis A until the base plate unit 36 is suspended from the hinge 54. This action is assisted by the spring-loading of the hinge 54. Because of the relative positions of the hinges 54, 60 (i.e., d2 is greater than d1), pivoting of the base plate unit 36 downwardly causes the hinge 60 (and, in turn, the splice site panel 62) to rise. As such, the top edge and cutout areas 68 of the splice site plate 62 can engage with engagement hooks: 70 that extend from the front edge of the ceiling 28 of the enclosure 22; this engagement may be augmented by the application of gentle finger pressure to the splice site plate 62 as the base plate unit 36 rotates downwardly. This interaction maintains the vertical orientation of the splice site panel 62. In this position, an operator can easily access the splice site carriers 64, the pigtail fibers 15 that lead from the splice site carriers 64 to the termination site cartridges 16 and the termination site cartridges 16 themselves (typically, the jumper fibers 17 that exit the cartridges 16 are removed or otherwise managed prior to the lowering of the base plate unit 36).

In the event that the operator wishes to access the cavity 25 of the enclosure 22 or access the rear surface of the splice site panel 62, he can temporarily rotate the main panel unit 36 upwardly until the top edge of the splice site panel disengages from the engagement hooks 70. The splice site plate 62 is then free to rotate (urged by the spring-loaded hinge 60) about the pivot axis B to a rear access position (FIG. 5) that enables the operator to easily access the remainder of the cavity 25 and the rear surface of the splice site plate 62 for OSP or building cable manipulations.

Figure 8:
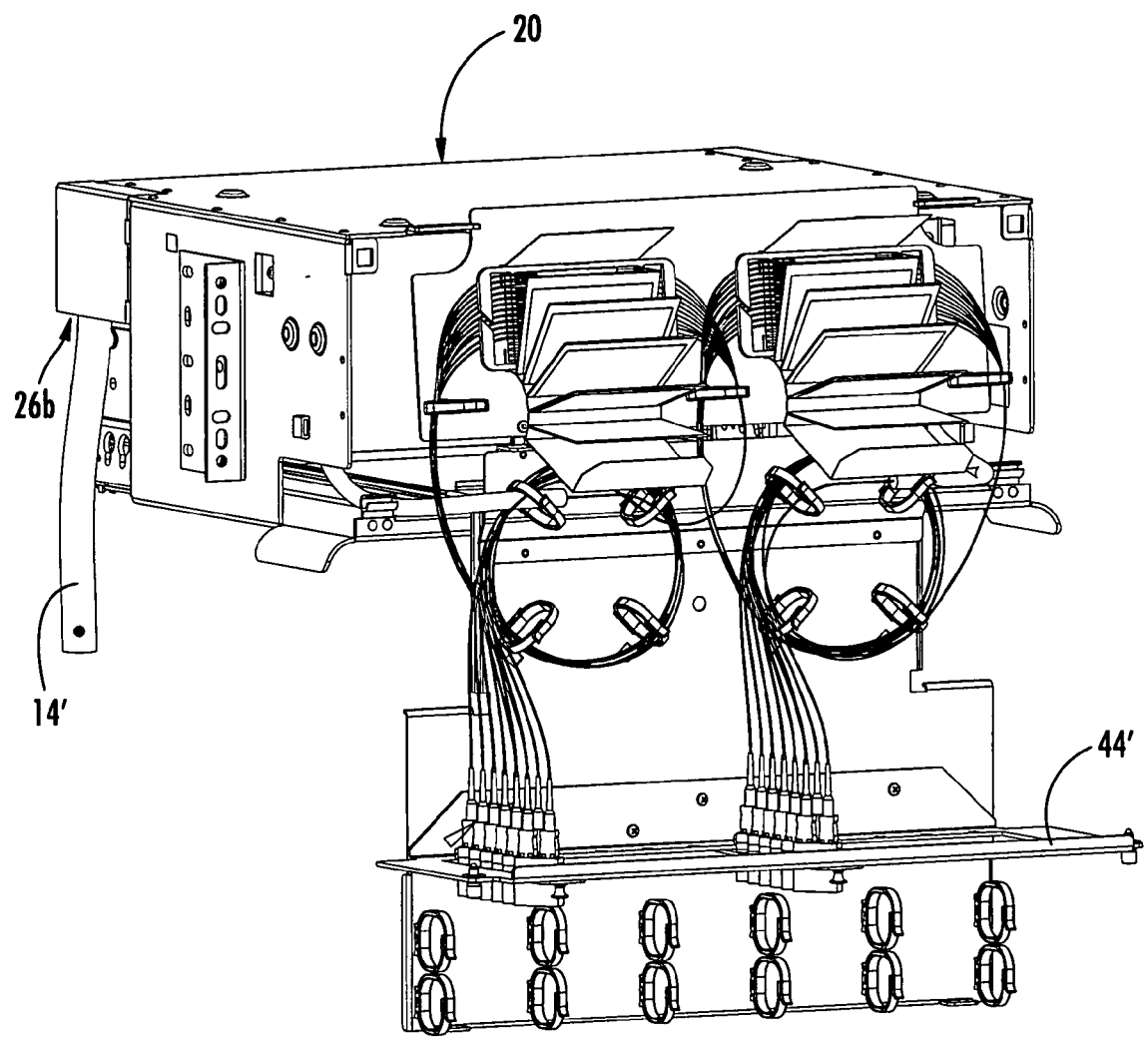
FIG. 8 is a perspective view of alternative embodiments of a shelf of the present invention.

FIGS. 8 and 9 illustrate some alternative embodiments of the present invention. FIG. 8 shows that OSP cables 14' can enter the enclosure 20 through the cable entry aperture 26b. Also, this embodiment illustrates the use of a modular faceplate 44' to provide fiber termination sites. Exemplary faceplates include Model Nos. 760021832 and 760021790 from SYSTIMAX Solutions. FIG. 9 shows that OSP cables 14" can enter the enclosure though the cable entry aperture 26c, and that a bezel frame 44" and bezels 44b can provide termination sites. Exemplary bezels and bezel frames include Model Nos. 760027755 and 860224914, available from SYSTIMAX Solutions.

It can be seen from the foregoing that shelves of the present invention can provide a dense arena for splice and termination sites on a single shelf. Also, such shelves can provide an operator with easy front access to the termination sites, the splice sites and the cavity of the enclosure without significant disassembly of the shelf. Further, the shelves can also provide rear access to the cavity if desired, whether the main panel unit resides in its lowered position or its stored position, as the splice site panel can be pivoted such that its top edge moves rearwardly to provide access to the enclosure cavity and to the front surface of the splice site panel from the rear.

Those skilled in this art will appreciate that, although the shelves discussed herein are directed for use with fiber optic equipment, such shelves may also be employed with other types of data- or power-carrying media, such as copper and/or coaxial cable, twisted pair cable, and the like. Also, shelves of the present invention may also find use in other types of cabinets, such as filing cabinets or kitchen cabinets, when shelf space may be at a premium; having an extendable main panel and a component mounting panel such as the splice site panel may serve many other storage and access purposes.

The foregoing is illustrative of the present invention, and is not to be construed as limiting thereof. Although exemplary embodiments of this invention have been described, those skilled in the art will readily appreciate that many modifications are possible in the exemplary embodiments without materially departing from the novel teachings and advantages of this invention. As such, all such modifications are intended to be included within the scope of this invention. The scope of the invention is to be defined by the following claims.

That which is claimed is:

1. A shelf within a rack or cabinet for providing access to items residing on the shelf, comprising:
    a main panel unit;
    a slide member pivotally attached to the main panel unit for pivotal movement about a first pivot axis and configured for slidable mounting relative to an enclosure such that the main panel unit can be moved from a retracted position within the enclosure to an extended position that is forward of the enclosure, the main panel unit being pivotable relative to the slide member between a raised position and a lowered position when extended forwardly of the enclosure; and
    a component mounting panel that is pivotally mounted to the main panel unit for pivotal movement about a second pivot axis between front access and rear access positions such that a front surface of the component mounting panel can be accessed from a forward work location when the component mounting panel is in the front access position, and a rear surface of the component mounting plate can be accessed from a forward work location when the component mounting plate is in its rear access position.

2. The shelf defined in claim 1, wherein the first and second pivot axes are substantially parallel to each other.

3. The shelf defined in claim 2, wherein the first and second pivot axes are noncoincident.

4. The shelf defined in claim 1, further comprising a cartridge mounting frame that includes sites for mounting fiber optic termination cartridges, the cartridge mounting frame being mounted to the main panel unit.

5. The shelf defined in claim 1, further comprising a splice site carrier mounted to the component mounting panel.

6. The shelf defined in claim 5, wherein the splice site carrier includes a plurality of splice sites.

7. The shelf defined in claim 1, wherein the main panel unit includes a ramped panel, and wherein the ramped panel is attached to the component mounting panel at the second pivot axis.

8. The shelf defined in claim 7, wherein, when the main panel unit is in the lowered position, the second pivot axis is positioned above and forwardly of the first pivot axis.

9. The shelf defined in claim 8, wherein, when the main panel unit is in the raised position, the second pivot axis is positioned above and rearwardly of the first pivot axis.

10. The shelf defined in claim 1, wherein the main panel unit includes a plurality of organizing rings mounted thereon.

11. The shelf defined in claim 1, wherein the component mounting panel includes a plurality of organizing rings mounted thereon.

12. The shelf defined in claim 1, further comprising an enclosure having a floor and a ceiling, and wherein the slide member is slidably mounted to the floor.

13. The shelf defined in claim 12, wherein the ceiling includes engagement members that engage an upper edge portion of the component mounting panel.

14. The shelf defined in claim 1, wherein the component mounting panel is pivotally mounted to the main panel unit such that pivoting of the component mounting panel about the second pivot axis away from the main panel unit permits access to the front surface of the component mounting panel.

15. An enclosed shelf within a rack or cabinet for providing access to fiber optic splice and termination sites located on the shelf, comprising:
    an enclosure;
    a main panel unit having a termination site mounting frame that includes sites for mounting fiber optic termination devices;
    a slide member pivotally attached to the main panel unit for pivotal movement about a first pivot axis, the slide member being slidably mounted to the enclosure such that the main panel unit can be moved from a retracted position within the enclosure to an extended position that is forward of the enclosure, the main panel unit being pivotable relative to the slide member between a raised position and a lowered position when extended forwardly of the enclosure; and
    a splice site mounting panel that is pivotally mounted to the main panel unit for pivotal movement about a second pivot axis between front access and rear access positions such that a front surface of the splice site mounting panel can be accessed from a forward work location when the splice site mounting panel is in the front access position, and a rear surface of the splice site mounting panel can be accessed from a forward work location when the splice site mounting panel is in its rear access position.

16. The shelf defined in claim 15, wherein the first and second pivot axes are substantially parallel to each other.

17. The shelf defined in claim 16, wherein the first and second pivot axes are noncoincident.

18. The shelf defined in claim 15, further comprising a splice site carrier mounted to the splice site mounting panel.

19. The shelf defined in claim 18, wherein the splice site carrier includes a plurality of splice sites.

20. The shelf defined in claim 15, wherein the main panel unit includes a ramped panel, and wherein the ramped panel is attached to the splice site mounting panel at the second pivot axis.

21. The shelf defined in claim 20, wherein, when the main panel unit is in the lowered position, the second pivot axis is positioned above and forwardly of the first pivot axis.

22. The shelf defined in claim 21, wherein, when the main panel unit is in the raised position, the second pivot axis is positioned above and rearwardly of the first pivot axis.

23. The shelf defined in claim 15, wherein the main panel unit includes a plurality of organizing rings mounted thereon.

24. The shelf defined in claim 15, wherein the splice site mounting panel includes a plurality of organizing rings mounted thereon.

25. The shelf defined in claim 24, wherein the ceiling includes engagement members that engage an upper edge portion of the splice site mounting panel when the splice site mounting panel is in the front access position.

26. The shelf defined in claim 15, wherein the splice site mounting panel is pivotally mounted to the main panel unit such that pivoting of the splice site mounting panel about the second pivot axis away from the main panel unit permits access to the front surface of the splice site mounting panel.

27. A communications termination and splicing system, comprising:
an equipment rack;
an enclosed shelf mounted to the equipment rack, the shelf comprising:
an enclosure;
a main panel unit having a termination site mounting frame that includes at least one site for mounting fiber optic termination devices;
a slide member pivotally attached to the main panel unit for pivotal movement about a first pivot axis, the slide member being slidably mounted to the enclosure such that the main panel unit can be moved from a retracted position within the enclosure to an extended position that is forward of the enclosure, the main panel unit being pivotable relative to the slide member between a raised position and a lowered position when extended forwardly of the enclosure; and
a splice site mounting-panel that is pivotally mounted to the main panel unit for pivotal movement about a second pivot axis between front access and rear access positions such that a front surface of the splice site mounting panel can be accessed from a forward work location when the splice site mounting panel is in the front access position, and a rear surface of the splice site mounting panel can be accessed from a forward work location when the splice site mounting panel is in its rear access position;
at least one fiber optic termination site device mounted in the main panel mounting sites;
a splice site carrier mounted to the splice site mounting panel;
a plurality of OSP cables optically connected to the splice sites on the splice site carrier;
a plurality of pigtail fibers extending between and connected to respective splice sites and termination sites; and
a plurality of optical jumper fibers connected to the termination sites.

28. The system defined in claim 27, wherein the first and second pivot axes are substantially parallel to each other.

29. The system defined in claim 28, wherein the first and second pivot axes are noncoincident.

30. The system defined in claim 27, wherein the main panel unit includes a ramped panel, and wherein the ramped panel is attached to the splice site mounting panel at the second pivot axis.

31. The system defined in claim 30, wherein, when the main panel unit is in the lowered position, the second pivot axis is positioned above and forwardly of the first pivot axis.

32. The system defined in claim 31, wherein, when the main panel unit is in the raised position, the second pivot axis is positioned above and rearwardly of the first pivot axis.

33. The system defined in claim 27, wherein the main panel unit includes a plurality of organizing rings mounted thereon.

34. The system defined in claim 27, wherein the splice site mounting panel includes a plurality of organizing rings mounted thereon.

35. The system defined in claim 27, wherein the ceiling includes engagement members that engage an upper edge portion of the splice site mounting panel when the splice site mounting panel is in the front access position.

36. The system defined in claim 27, wherein the splice site mounting panel is pivotally mounted to the main panel unit such that pivoting of the splice site mounting panel about the second pivot axis away from the main panel unit permits access to the front surface of the splice site mounting panel.

* * * * *

UNITED STATES PATENT AND TRADEMARK OFFICE
CERTIFICATE OF CORRECTION

| | |
|---|---|
| PATENT NO. | : 7,031,588 B2 |
| APPLICATION NO. | : 10/832893 |
| DATED | : April 18, 2006 |
| INVENTOR(S) | : Cowley et al. |

It is certified that error appears in the above-identified patent and that said Letters Patent is hereby corrected as shown below:

Drawings:
Sheet 4 of 12
FIG. 3 should be replaced with the attached formal drawing.

Signed and Sealed this

Twenty-fourth Day of October, 2006

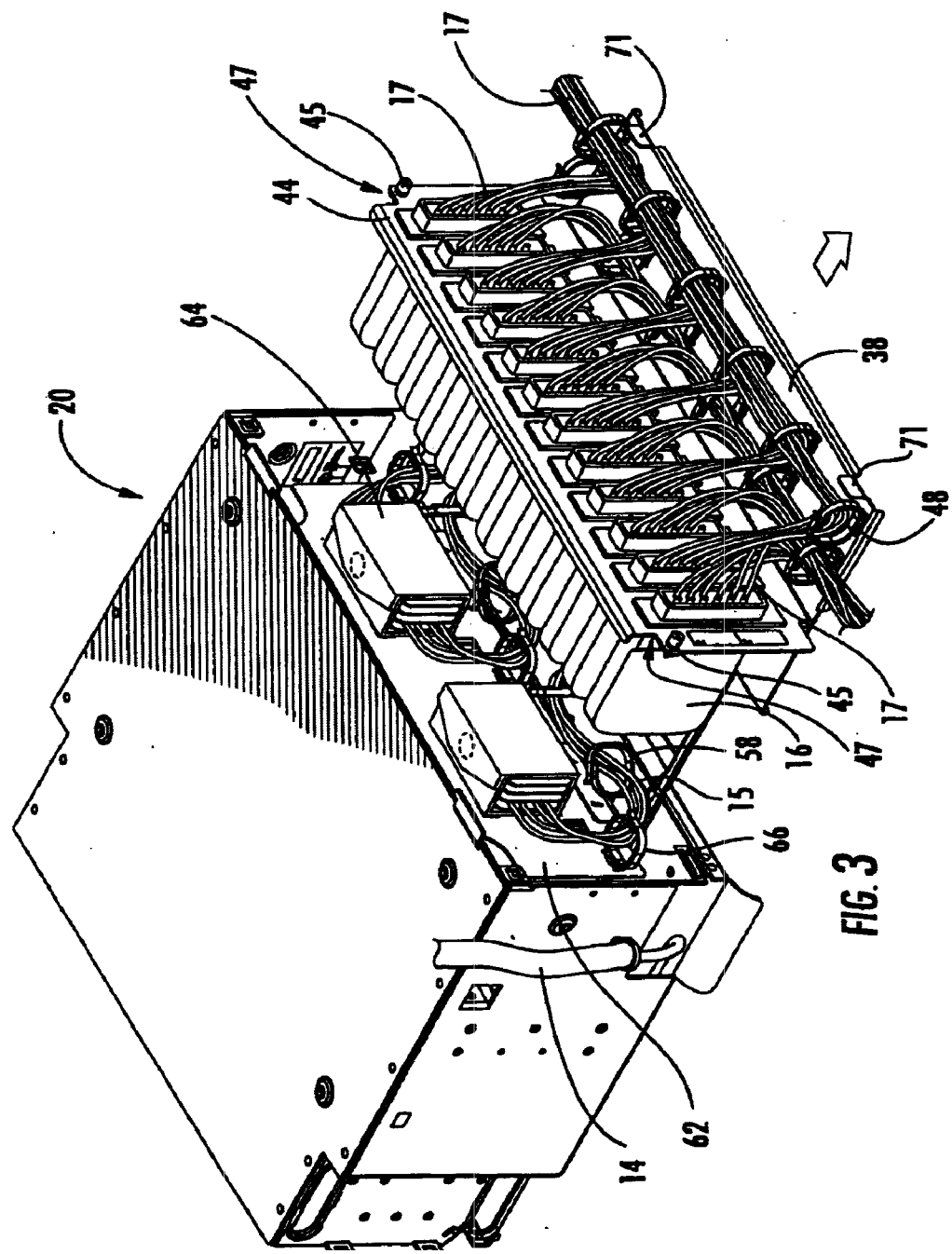

JON W. DUDAS
*Director of the United States Patent and Trademark Office*